United States Patent [19]

Wadensten

[11] 4,407,403
[45] Oct. 4, 1983

[54] VIBRATORY BELT CLEANING APPARATUS FOR AN ENDLESS CONVEYOR

[76] Inventor: Theodore S. Wadensten, P.O. Box 8, Wyoming, R.I. 02898

[21] Appl. No.: 272,303

[22] Filed: Jun. 10, 1981

[51] Int. Cl.³ .............................................. B65G 45/00
[52] U.S. Cl. .................................................. 198/494
[58] Field of Search ..................... 198/494, 499; 474/92

[56] References Cited

U.S. PATENT DOCUMENTS

| | | | |
|---|---|---|---|
| 2,873,847 | 2/1959 | Holland | 198/494 |
| 2,885,069 | 5/1959 | Bowen | 198/494 |
| 3,315,794 | 4/1967 | Ellington | 198/499 |
| 4,036,351 | 7/1977 | Reiter | 198/499 |
| 4,042,102 | 8/1977 | Wadensten | 198/494 |
| 4,174,030 | 11/1979 | Philibert | 198/494 |
| 4,249,650 | 2/1981 | Stahura | 198/499 |
| 4,280,616 | 7/1981 | Wadensten | 198/494 |

FOREIGN PATENT DOCUMENTS

| | | | |
|---|---|---|---|
| 2810931 | 9/1978 | Fed. Rep. of Germany | 198/494 |
| 1397714 | 6/1975 | United Kingdom | 198/494 |

*Primary Examiner*—Joseph E. Valenza
*Attorney, Agent, or Firm*—Ralph R. Roberts

[57] ABSTRACT

This invention pertains to cleaning apparatus for a conveyor belt. This cleaner employs gravitational force to apply vibratory action on the conveyor belt. A free-turning roller engages the inner surface of the returning extent of the conveyor belt at a point and position near the tail pulley. Four embodiments are shown. The first shows the motor and vibrated pulley disposed between the extents of belt. The second embodiment has the motor disposed below the return extent of belt. The third embodiment in which the belt extents are too close together to mount the motor between the belts has the motor disposed above the incomming belt. The fourth embodiment shows vibration isolators which are used to reduce any transmission of vibrations into the frame supporting the pulleys of the conveyor belt. The vibrated frame is carried in channel shaped guideways lined with a non-metallic liner so the vibrated frame is gravitationally movable in the channels.

16 Claims, 12 Drawing Figures

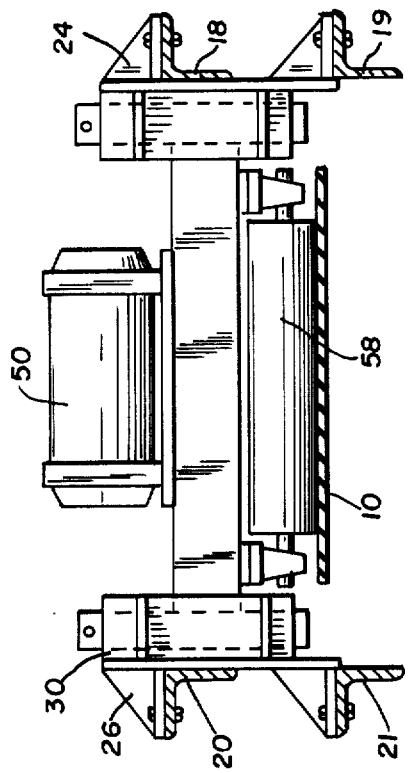
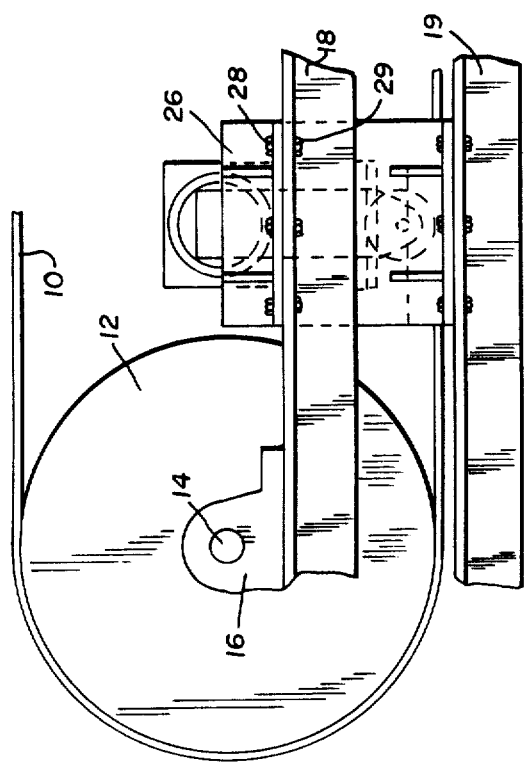
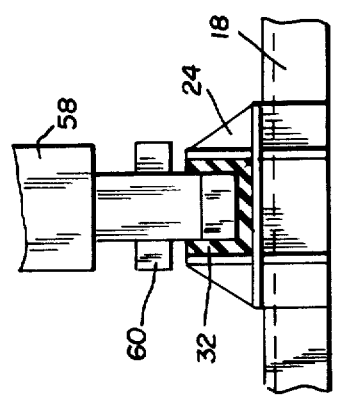

VIBRATORY BELT CLEANING APPARATUS FOR AN ENDLESS CONVEYOR

CROSS REFERENCE TO RELATED PATENTS AND APPLICATIONS

This application pertains to the field of conveyor belt cleaners and in this regard U.S. Pat. No. 4,042,102 as issued Aug. 16, 1977 to Applicant is noted. In this same field is also Applicant's granted application Ser. No. 018,589 as filed Mar. 8, 1979 now U.S. Pat. No. 4,280,616.

BACKGROUND OF THE INVENTION

1. Field of the Invention

With reference to the classification of art as established in and by the United States Patent and Trademark Office the present invention pertains to the general class entitled, "Conveyors" (Class 198) and particularly to the subclass entitled, "Having cleaning means" (Subclass 494).

2. Description of the Prior Art

Scrapers, brushes and spoke wheels imparting vibrational forces to a conveyor belt are well known and shown in prior art devices. In so far as is known such prior art showings do not provide an adjustable high frequency vibrator which communicates directly to a free turning roller which is carried on the inside of an endless conveyor belt on its returning trip. Vibrators, particularly pertaining to endless conveyor belts, are well known with either pneumatic, hydraulic or electric motor means providing vibrations in and to the travelling belt of cycles of twelve-hundred through nine-thousand vibrations per minute. Conveyor belt systems commonly used to transport materials, particularly up and down slopes of belts, often have toothed or corrugated surfaces. Scrapers and/or brushes are often unsatisfactory for removing items or material from the transportating surfaces of these belts due to the size, fragile construction or composition of the particles. The vibrating apparatus used on conveyor belts is shown in many patents and in particular to patents granted in the United States. To the extent applicable and included by reference in this application is Applicant's U.S. Pat. No. 4,042,102 as issued Aug. 16, 1977 and U.S. Pat. No. 4,280,616. The vibrating conveyor cleaner of this invention is particularly useful for removing particles from the surface of a conveyor belt. The frequency and aptitude of the vibrator apparatus is adjusted so as to accommodate the removal of a particular item that may adhere on or to the belt.

SUMMARY OF THE INVENTION

This invention may be summarized, at least in part, with reference to its objects. It is an object of this invention to provide, and it does provide, a variable speed vibrator apparatus which transmits induced vibrations to a free-turning roller which is gravitationally carried by and in contact with the inside of a conveyor belt.

It is a further object of this invention to provide, and it does provide, a vibrating roller which is in engagement with and vibrates the inside of a travelling conveyor belt at the lower inner extent of said belt. This vibrating roller is carried on a frame carrying a vibrating apparatus and said roller is gravitationally urged within isolating guides toward the belt with said vibrating apparatus adjustable from twelve-hundred to nine-thousand cycles per minute.

This invention provides a vibratory cleaning apparatus with a motor which is either electric, pneumatic or hydraulically actuated and the vibrations are from twelve hundred to nine thousand cycles per minute. These vibrations are transmitted to a free-turning roller which is in gravitational engagement with the inside of a conveyor belt. This roller engages the returning extent of this belt and is adjacent to the discharge pulley. A preferred embodiment is shown with the vibrator and roller in vertical array and guided by a vertically disposed channel bracket. Four embodiments of these channel bracket supports are shown. The first embodiment shows the bracket secured to the frame; the second embodiment shows the vibrations from the vibrator apparatus to the belt being further isolated from the frame carrying the belt; the third embodiment shows the vibration motor carried below the return extent of the conveyor and a fourth embodiment is shown in which the conveyor belt extents are closer than the vibration motor and roller so that the vibration motor is carried above the top extent of conveyor belt. It is to be noted that the freely turning roller is directly vibrated by the vibrator apparatus which is adjusted as to speed to effectively remove the material adhering to the exterior belts or surfaces.

The vibration apparatus hereinafter more fully described employs a direct gravitational force from the motor vibrator to the free-turning roller carried by the vibrated frame. This frame and its components are restrained in and by substantially vertical channel guide means. Each guide channel has a liner that may be resilient such as Neophrene or may be a plastic such as Teflon (®E. I. duPont). This liner is adapted to guide the vibrated apparatus frame with a minimum of transmission of vibrations to the belt support frame whole providing a sliding guideway. In an alternate embodiment the guide brackets and non-metallic liner therein are further dampened by isolators between the brackets and the support frame.

In addition to the above summary the following disclosure is detailed to insure adequacy and aid in understanding of the invention. This disclosure, however, is not intended to cover each new inventive concept therein no matter how it may later be disguised by variations in form or additions of further improvements. For this reason there has been chosen four specific embodiments of the vibrating assembly as adopted for use with a conveyor belt and showing a preferred means for vibrating the freely turning roller. These specific embodiments have been chosen for the purposes of illustration and description as shown in the accompanying five sheets of drawings.

BRIEF DESCRIPTION OF THE DRAWINGS

FIG. 1 represents a fragmentary side view of the vibratory belt cleaning apparatus of this invention and showing a tail end portion of an endless conveyor belt carried by a frame, a vibratory motor and a free-turning roller moved by this vibratory apparatus, this roller being carried adjacent the discharge pulley of the belt conveyor;

FIG. 2 represents a transverse view of the apparatus of FIG. 1 with omission of the discharge pulley but showing the arrangement of the preferred vibratory apparatus, this view taken on the line 2—2 of FIG. 1 and looking in the direction of the arrows;

FIG. 3 represents a fragmentary plan or top view and showing a near or one end of the vibration apparatus of FIG. 1;

EMBODIMENT OF FIGS. 1 THROUGH 5

Figure 5:
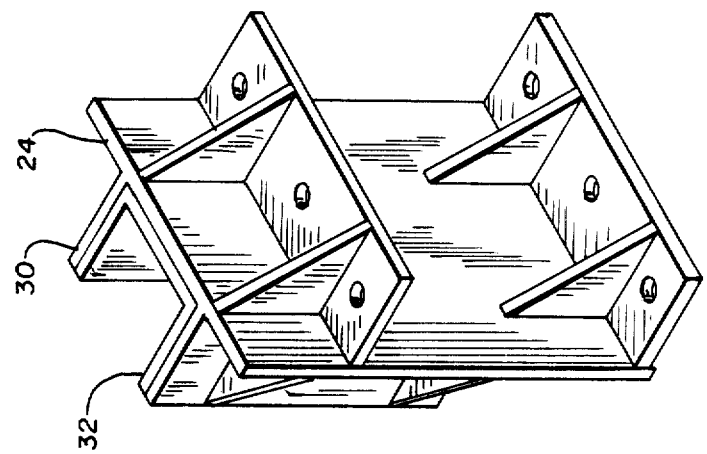
FIG. 5 represents an isometric view in the enlarged scale of the support bracket for carrying the vibration apparatus of FIG. 4.

Referring to the preferred embodiment and the vibratory apparatus of FIGS. 1 through 5, it is to be noted that an endless conveyor belt 10 is carried, at least in part, by a tail or discharge pulley 12. This pulley is carried by and mounted on a shaft 14 carried by antifriction pulley blocks 16 secured to a frame which may have upper and lower angle members 18 and 19. Like angle members are shown in FIG. 2 and are identified as 20 and 21. This frame is secured to a support not shown. Right and left hand support brackets (near and far) 24 and 26 are weldments and are shown in greater detail in FIGS. 4 and 5. Bolts and nuts 28 and 29 pass through appropriately sized and spaced holes in the brackets 24 and 26 and in the upper and lower angle members 18, 19, 20 and 21 of the frame to provide a positive alignment and placement of the vibratory apparatus on this belt.

Figure 4:
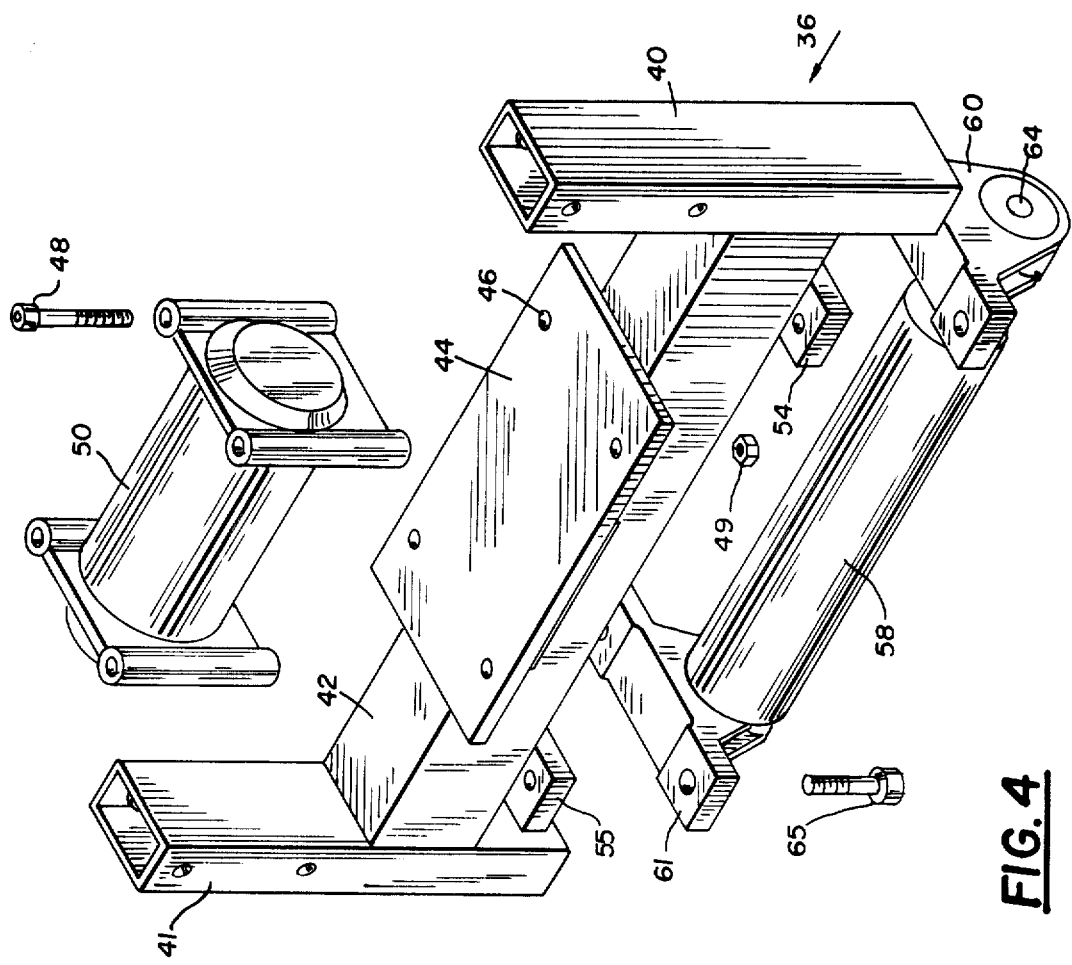
FIG. 4 represents an enlarged isometric view in an expanded and diagrammatic arrangement and showing the several components of the vibrating apparatus prior to the assembly of said apparatus.

As seen in FIGS. 4 and 5, each bracket 24 and/or 26 has an interior channel 30 which is open to the inside. Secured to this channel and lining the inwardly facing surfaces is a guide member 32. Conventionally this liner is about one-quarter of an inch in thickness but may be more if desired. This liner may be of rubber-like material or may be of a slippery plastic with great resistance to abrasion. Such material is Teflon or Nylon, both of which are trademarks of E. I. duPont. A vibratory frame generally identified as 36 includes near and far tubular vertical members 40 and 41. These vertically disposed tubular members are secured to a transverse beam 42 as by welding. This beam has a support plate 44 fixedly secured to the transverse beam 42. Mounting holes 46 are provided in this support plate so that bolts and nuts 48 and 49 may and do provide for the removable securing of a vibratory motor and means 50. This motor and vibratory means may be electric, pneumatic or hydraulic powered and is conventional. The vibratory apparatus is anticipated to provide vibrations of twelve hundred to nine thousand cycles per minute.

As seen in FIGS. 1, 2 and 3, this transverse beam 42 also has two extending ear members 54 and 55 which provide means for securing to this beam a roller 58 in a free-turning condition. Pulley blocks 60 and 61 are carried by these ear members 54 and 55 and these blocks carry a shaft 64 by which the roller 58 is supported in a free-turning condition. Cap screws 65 conventionally secure pulley blocks 60 and 61 to ear members 54 and 55. In an assembled condition the motor 50 is secured to the beam 42 and vibrates the beam and the secured roller 58 to provide a controlled amplitude and speed.

It is to be noted that this apparatus vibrates the roller 58 with a directly applied force from the motor 50. The channel brackets 24 and 26 and the guide liner member 32 mounted within the channel 30 are adapted to isolate any and all vibrational forces from the frame angles 18, 19, 20 and 21. The vibrational forces produced by the motor 50 are transmitted directly to the roller 58 with the guide member 32 only providing limiting means against unwanted sidewards and forward and back motion in the direction of and counterflow to the travel of the belt 10. This vibratory force is gravitionally applied directly by the motor 50, the roller 58 and the frame 36. This force is made to accommodate particular conditions encountered by the conveyor belt. For example, when the material is very tacky the vibratory actuation and/or amplitude may be greater than for material that is easier to dislodge.

ALTERNATE SUPPORT AS SEEN IN FIGS. 6, 7 AND 8

Figure 7:
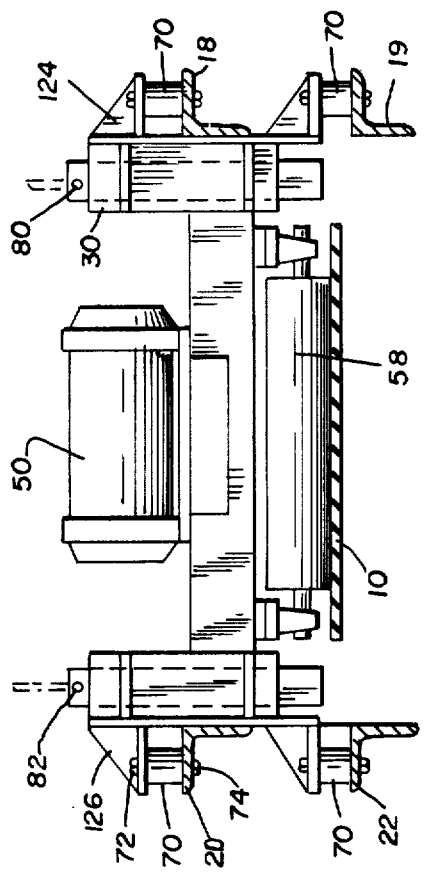
FIG. 7 represents a transverse view of the apparatus of FIG. 6 with omission of the discharge pulley, this view taken on the line of 7—7 of FIG. 6 and looking in the direction of the arrows.
Figure 6:
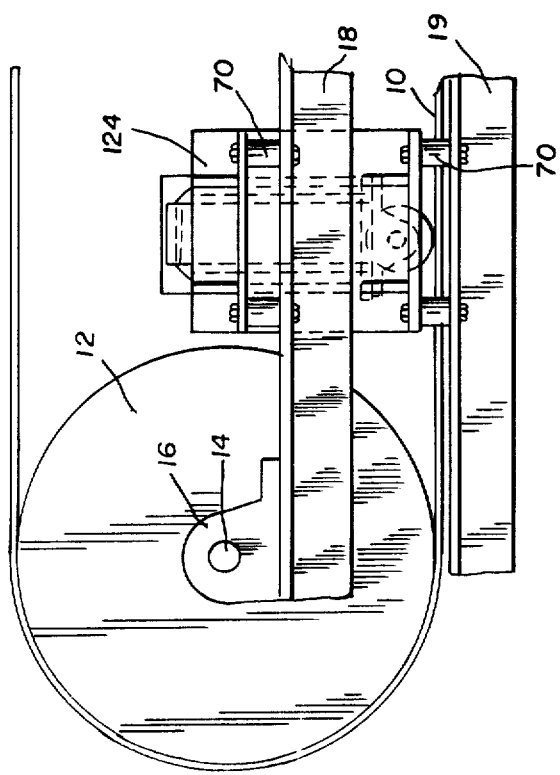
FIG. 6 represents a fragmentary side view of the vibratory belt cleaning apparatus similar to FIG. 1 but showing the bracket support and additional vibration isolators used therewith.
Figure 8:
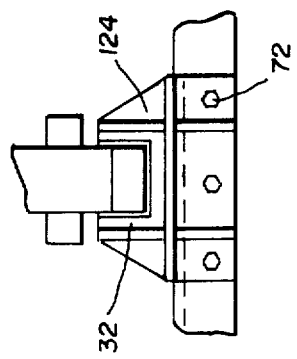
FIG. 8 represents a fragmentary plan or top view and showing a near end view of the vibration apparatus of FIG. 6.

The apparatus of FIGS. 1 through 5 may be mounted so as to further inhibit or limit the transmittal of vibratory forces to angle frame members 18 through 21. As above depicted and described, the vibratory apparatus is disposed to remove unwanted material from the returning (lower) extent of the belt 10. As above, belt 10, pulley 12, shaft 14, pulley blocks 16 and angles 18 and 19 are as in FIG. 1. In FIGS. 6, 7 and 8, brackets 124 and 126 are similar to the brackets 24 and 26 but are modified to utilize additional vibration dampening means in the form of rubber shocks or isolators 70. These shocks or isolators are interposed between frame angles 18 through 21 and the brackets 124 and 126 so that vibrations may be further isolated from the support frame for the belt. Bolts and nuts 72 and 74 may be used with hollow rubber shocks or bolts with isomodes having tapped means at both ends may be provided.

As seen in FIGS. 6, 7 and 8 the brackets 124 and 126 guide and restrain the vibratory apparatus including the motor 50 and the roller 58. The guide member 32 is identical or similar to that described above. The roller 58 is carried as above and is brought to the inside of the belt as in FIGS. 6 and 7. Except for the additional vibratory isolation this apparatus is as in FIGS. 1 through 5 above described. No matter the means, this embodiment is provided so as to reduce to a minimum the vibrational forces transmitted from the vibration apparatus to the frame.

The embodiment shown in FIGS. 1 through 5 and the alternate suspension means of FIGS. 6 through 8 anticipate the use in various conveyors. The belts used therewith may conduct very tacky materials or may have toothed or corrugated surfaces presenting difficulties in cleaning. The vibration apparatus employed has a variable speed motor 50 and the vibratory roller 58 that is directly coupled to and driven by the motor. It is to be noted that in FIGS. 2, 4 and 7, the vertical tubular members 40 and 41 have one or more lift holes 80 and 82 which may be used with hoist means to lift the vibratory assembly into and from the guide members 32. It is to be noted that the embodiments shown and described pertain to a belt cleaning apparatus in which the vibratory motor is carried on a plate and beam and includes side guides extending down to a freely rotatable roller disposed to engage the inside return extent of the conveyor belt. It is to be noted that the vibratory apparatus is carried within guide brackets secured to the frame within the conveyor. These brackets are disposed to provide inwardly open and resiliently lined guideways allowing the lower roller to be gravitationally in contact against the inner surface of this returning extent of conveyor belt. The resilient lining of these fixed brackets provide resilient isolation of the vibrations of the vibrating apparatus to the side bracket and frame. Additional isolators are shown in FIGS. 6, 7 and 8 and provide brackets in which additional isolation means prevent transmission of vibratory forces to the frame of the conveyor.

EMBODIMENT OF FIGS. 9 AND 10

Figure 10:
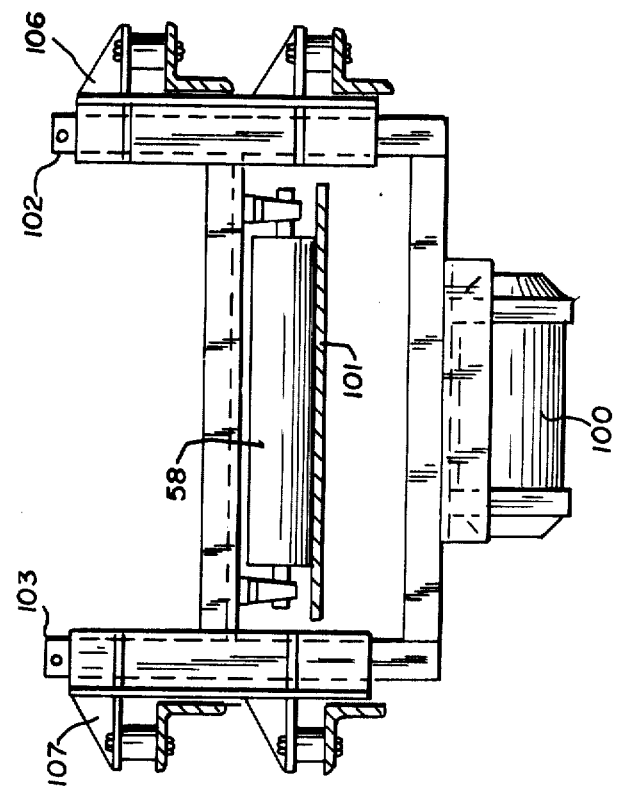
FIG. 10 represents a transverse view of the apparatus of FIG. 9 with the omission of the discharge pulley, this view taken on the line 10—10 of FIG. 9 and looking in the direction of the arrows.
Figure 9:
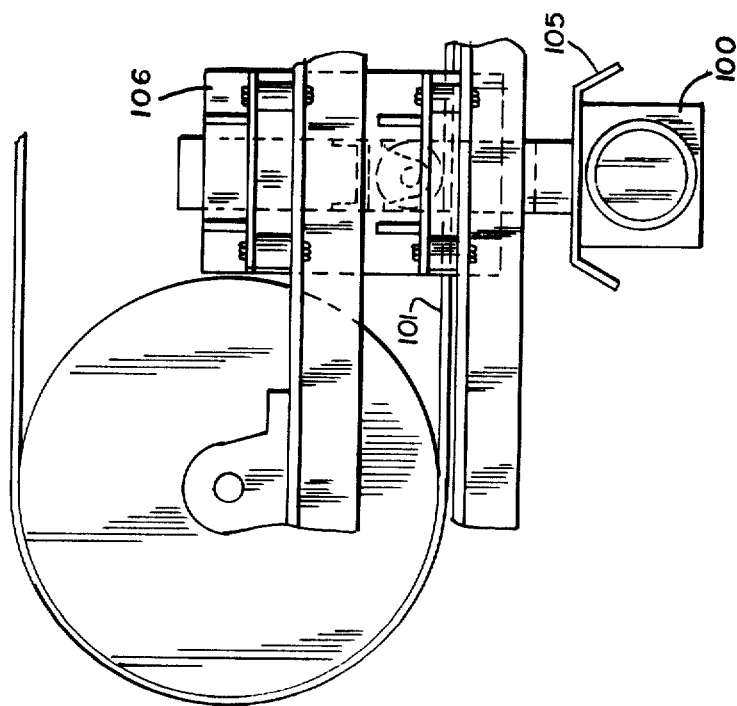
FIG. 9 represents another fragmentary side view of a vibratory belt cleaning apparatus similar to FIG. 6 but with the vibratory motor carried below the returning extent of conveyor belt.

Referring next to FIGS. 9 and 10, it is to be noted that certain discharge conveyor belt installations have the vibration motor 100 carried below the returning conveyor belt 101. The same or similar brackets as in FIGS. 5 and 7 may be used and are mounted on the framework carrying the pulley and belt. Vertical tubular members 102 and 103 are slidable in the guideway of the bracket. As in U.S. Pat. No. 4,042,102 the motor 100 is protected from debris from deflector plate 105. The guideways of the brackets allow the free-turning roller 58 to be gravitationally urged and moved into contact with the inside of the belt. The support frame for the conveyor may be such that the brackets 106 and 107 require a special configuration. This is determined by the conveyor construction but the guideway provided in each bracket is lined with either a resilient material or a plastic material giving a slippery slide means. As in the above examples, the vibratory cleaning apparatus may employ additional vibration dampeners as in FIGS. 6, 7 and 8 or may be as in FIGS. 1 through 5. The force vibration and the diameter and width of the free-turning roller is selected to accommodate the use of the cleaning apparatus.

EMBODIMENT OF FIGS. 11 AND 12

Figure 12:
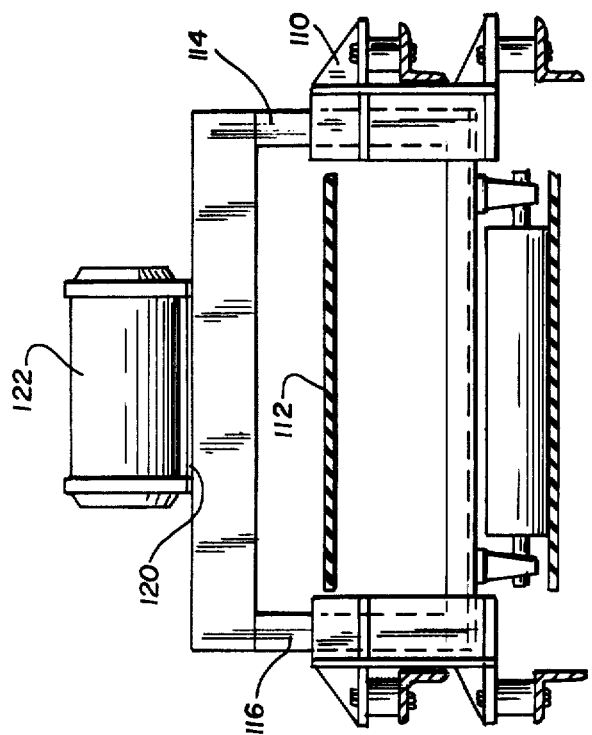
FIG. 12 represents a transverse view of the apparatus of FIG. 11 with the omission of the discharge pulley, this view taken on the line 12—12 of FIG. 11 and looking in the direction of the arrows.
Figure 11:
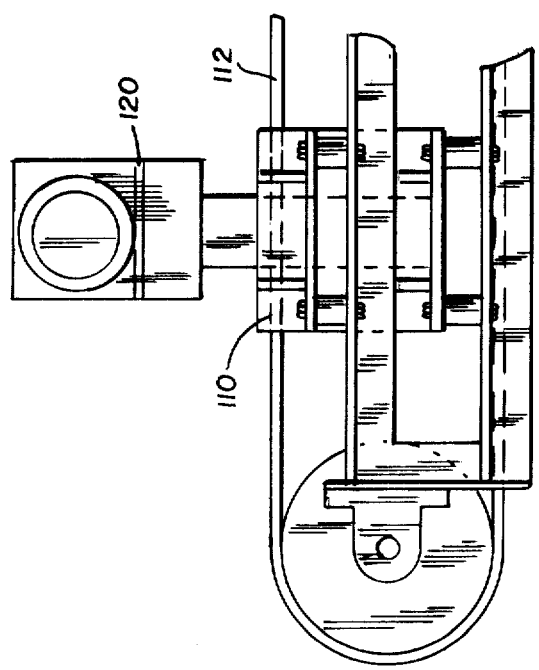
FIG. 11 represents yet another fragmentary side view of a vibratory belt cleaning apparatus similar to FIG. 6 but with the vibratory motor carried above the carrying upper surface belt where and when the belt extents are substantially close together so that the vibrated apparatus cannot be disposed between the belts.

Referring next and finally to the drawings and FIGS. 11 and 12, it is to be noted that in certain conveyor installations the pulleys are small and hence the top and bottom belt extents are close together and preclude the placing of the vibrator motor between the belt extents. This problem sometimes requires the design of the belt cleaning apparatus to have the motor mounted above the incomming extent of belt. This is diagrammatically shown in FIGS. 11 and 12.

Brackets 110 have guideways therein and each guideway is lined as in FIG. 5 above described. This liner and the guideway is directed inwardly so that the tubular members of the vibrated assembly are carried therein as in the above embodiments. As depicted, the guideway in the bracket is extended sufficiently above the upper extent 112 of the conveyor belt so that both tubular portions 114 and 116 are slidable therein. The support plate 120 is similar to support plate 44 in FIG. 4 and the vibrator motor 122 is selected to produce the desired speed and amplitude of vibrations. Additional vibration dampening as in FIGS. 6, 7 and 8 may be furnished if desired.

It is to be noted that the non-metallic liner carried within the channel brackets 24 and 26 may be partly closed to encase the guide portions. This does not preclude the closing of the lower end of the channel as long as the guide portions are freely slidable within the liner portions. Since the conveyor belt installations are often established and in use, the support brackets and the vibrated apparatus frame are often custom made or at least altered to accommodate the particular belt and material. Vibration frequency and amplitude may have to be changed because of climatic conditions (temperature and humidity) and changes in the quantity and quality of material being transferred. For this reason the apparatus shows, between the belt extents, a motor below the returning belt and a motor above the transportating surface of the belt. Although the drawings depict the preferred vibration apparatus as being between the conveyor belts, this does not preclude other arrangements as in FIGS. 9 through 12. What is new and novel is that the brackets be provided with substantially vertical guideways and that liner means are provided so that the vibrated roller is gravitationally urged into contact with the inner surface of the returning belt. The additional dampening isolators shown in FIGS. 6, 7 and 8 conventionally are secured with and by through bolts but other securing means may be provided. A liner in the bracket guideway is shown and used so as to provide vibration isolation and reduce noise. Dust shielding devices to reduce wear and tear on the channel liner are contemplated where and when required because of dusty or abrasive conditions.

It is to be noted that the conveyor support frame is shown with outwardly extending angles that provide shelves to which the brackets may be secured but this is not to preclude other framework. It is only essential that the fixed brackets provide substantially vertical guideways and that the vibrating apparatus include a free-turning roller that engages substantially the entire width of the belt. Whether the vibrated roller is free-turning on a shaft or the shaft is free-turning while supported in the depicted pillow blocks is merely a matter of choice. It is very important that the vibrated roller be gravitationally brought to the belt and that the vibration force as produced by the motor be applied to this roller with a minimum of transmission of vibration to the support frame of the conveyor. Although shown as outwardly extending angles the support frame may be arranged so the support or projecting portions extend inwardly.

Terms such as "left", "right", "up", "down", "bottom", "top", "front", "back", "in", "out" and the like and applicable to the embodiments shown and described in conjunction with the drawings. These terms are merely for the purposes of description and do not necessarily apply to the position in which the vibratory belt cleaner may be constructed or used.

While particular embodiments of the arrangement of the apparatus and placement of the vibratory motor have been shown and described it is to be understood that the gravitational application of the applied force of this invention is not limited thereto and protection is sought to the broadest extent the prior art allows.

What is claimed is:

1. A vibratory belt cleaning apparatus for an endless conveyor belt as carried by head and tail pulleys supported by a frame, said vibratory cleaning apparatus disposed immediately adjacent the tail pulley and disposed and positioned to contact the inner surface of the returning conveyor belt to locally vibrate the conveyor belt to remove unwanted particles from the exterior surface of the belt after discharge has been made from the tail pulley, the vibratory belt cleaning apparatus including:
   (a) a support frame for the conveyor belt and pulleys, said frame including support shelf portions;
   (b) a pair of brackets securable to said frame for rigid attachment thereto, each of said brackets disposed to provide a channel open at least to its top, said channel when the brackets are secured to the frame disposed substantially vertically;
   (c) a channel shaped non-metallic liner within and secured to the channel in each bracket, said liner at least in part open toward the belt;
   (d) a vibrated apparatus frame having guide portions disposed so as to be slidable in the channel shaped non-metallic liner in the secured brackets, said vibrated apparatus frame including a support plate disposed between the guide portions and on which is mountable a motor vibrator;
   (e) a variable speed and force vibrator motor removably securable to the support plate of the vibrated apparatus frame, the vibrational range providing from twelve hundred to nine thousand cycles per minute, and
   (f) a freely-turning roller carried on a shaft secured to the guide portions of the vibrated apparatus frame, said vibrated roller gravitationally engaging the inside of the returning extend of the conveyor belt while said vibrations are isolated from the conveyor support frame by the non-metallic liner within the channel of the bracket.

2. A vibratory belt cleaning apparatus as in claim 1 in which the support frame for the conveyor includes outwardly extending projecting portions on which is mounted and secured the bracket.

3. A vibratory belt cleaning apparatus as in claim 2 in which the brackets are supported by vibration isolators interposed between the support frame and supporting portions of the bracket.

4. A vibratory belt cleaning apparatus as in claim 2 in which the brackets are supported by vibration isolators interposed between the support frame and projecting portions of the bracket and with bolt means for securing the bracket to the support frame with the shank of the bolt extending through an isolator.

5. A vibratory belt cleaning apparatus as in claim 1 in which the shaft carrying the freely-turning roller is carried in antifriction bearings in pillow blocks secured to the vibrating apparatus frame.

6. A vibratory belt cleaning apparatus as in claim 5 in which the guide portions of the vibrated apparatus frame are tubular members.

7. A vibratory belt cleaning apparatus as in claim 5 in which the guide portions of the vibrated apparatus frame additionally have apertures therein for securing thereto of lifting cables.

8. A vibratory belt cleaning apparatus as in claim 1 in which the channel shaped non-metallic liner is of rubber-like material secured to the channel in the bracket.

9. A vibratory belt cleaning apparatus as in claim 1 in which the brackets have the channels made as through configurations.

10. A vibratory belt cleaning apparatus as in claim 1 in which the support frame for the conveyor includes angle portions on which is mounted and secured the bracket.

11. A vibratory belt cleaning apparatus as in claim 1 in which the vibrating apparatus is disposed between the conveyor belts.

12. A vibratory belt cleaning apparatus as in claim 1 in which the motor means on the vibrated apparatus frame is disposed below the return extent of the conveyor belt and is substantially in vertical alignment with the vibrated roller.

13. A vibratory belt cleaning apparatus as in claim 1 in which the motor means includes a deflector shield to prevent accumulation of any particles on the vibratory motor.

14. A vibratory belt cleaning apparatus as in claim 1 in which the motor means on the vibrated apparatus frame is disposed above the top extent of the belt and is substantially in vertical alignment with the vibrated roller.

15. A vibrated belt cleaning apparatus as in claim 1 in which the non-metallic liner is of Teflon.

16. A vibratory belt cleaning apparatus as in claim 1 in which the non-metallic liner is of resilient material such as Neoprene.

* * * * *